United States Patent [19]

Nelsen et al.

[11] Patent Number: 6,020,414
[45] Date of Patent: *Feb. 1, 2000

[54] METHOD AND COMPOSITIONS FOR TOUGHENING POLYESTER RESINS

[75] Inventors: Suzanne Nelsen, Mountain Lake; Michael Golder, Allendale; Paul DeStio, Bound Brook; Mengshi Lu, New Providence, all of N.J.

[73] Assignee: Hoechst Celanese Corporation, Somerville, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/740,006

[22] Filed: Oct. 23, 1996

[51] Int. Cl.$^7$ .................................................... C08L 67/02
[52] U.S. Cl. .......................... 524/424; 524/440; 524/449; 524/451; 524/452; 524/513; 525/166; 525/176
[58] Field of Search .............................. 525/166, 64, 176; 524/513, 424, 440, 449, 451, 452

[56] References Cited

U.S. PATENT DOCUMENTS

| | | |
|---|---|---|
| Re. 32,334 | 1/1987 | Deyrup . |
| 3,368,995 | 2/1968 | Furukawa . |
| 3,562,200 | 2/1971 | Jones . |
| 3,937,757 | 2/1976 | Seydl . |
| 3,953,394 | 4/1976 | Fox . |
| 4,122,061 | 10/1978 | Holub . |
| 4,140,670 | 2/1979 | Charles . |
| 4,172,859 | 10/1979 | Epstein . |
| 4,246,378 | 1/1981 | Kometani . |
| 4,284,540 | 8/1981 | Iida . |
| 4,320,045 | 3/1982 | Owen . |
| 4,369,280 | 1/1983 | Dieck . |
| 4,444,931 | 4/1984 | Lu . |
| 4,471,108 | 9/1984 | Belder . |
| 4,499,239 | 2/1985 | Murakami . |
| 4,670,508 | 6/1987 | Ohdaira . |
| 4,694,042 | 9/1987 | McKee . |
| 4,753,980 | 6/1988 | Deyrup . |
| 4,891,406 | 1/1990 | Bittscheidt . |
| 4,900,788 | 2/1990 | Subramanian . |
| 5,039,727 | 8/1991 | Onishi . |
| 5,086,117 | 2/1992 | Ohmae ..................................... 525/166 |
| 5,175,204 | 12/1992 | Orikasa . |
| 5,208,292 | 5/1993 | Hert ........................................ 525/166 |
| 5,241,019 | 8/1993 | Otsuki . |
| 5,254,626 | 10/1993 | Penco . |
| 5,344,912 | 9/1994 | Dalgewicz . |
| 5,407,706 | 4/1995 | Kano . |
| 5,483,001 | 1/1996 | Hert ........................................ 525/166 |
| 5,510,454 | 4/1996 | Stouffer . |
| 5,543,464 | 8/1996 | Decker . |
| 5,554,120 | 9/1996 | Chen ....................................... 525/166 |

FOREIGN PATENT DOCUMENTS

| | | | |
|---|---|---|---|
| 0 342 067 | 11/1989 | European Pat. Off. | ........ C08L 67/00 |
| 0 481 471 | 4/1992 | European Pat. Off. | ........ C08L 67/02 |
| 0 747 070 | 12/1996 | European Pat. Off. | ........ A61L 29/00 |
| 01247454 | 10/1989 | Japan | ..................... 525/166 |

OTHER PUBLICATIONS

C. Billet, "A New Acrylic Polymer For Impact Improvement of Recycled PET", Recycle'89 Forum, OCt. 10–13, 1989, Davos, Switzerland.

Leclere, Perret, Bouilloux, Hert, "Encapsulation A New Process For Polymer Blends", Additives '96, Houston, Texas, Feb. 19–21, 1996.

Gravalos Kostas G. ,et al.: "In Situ compatibilization of poly(ethylene terephthalateo/poly (ethylene–co–ethyl acrylate) blends", Polymer, vol. 36, Nov. 7, Mar. 1, 1995, pp. 1393–1399, XP000519742.

*Primary Examiner*—Patricia A. Short

[57] ABSTRACT

An acrylic modifier composition for improving impact resistance of polyester compositions is provided which comprises (a) between about 10% to about 90% by weight of a first component selected from the group consisting of an ethylene alkyl acrylate co-polymer and ethylene alkyl methacrylate copolymer, wherein the alkyl is C1 to C10; and (b) between about 10% to about 90% by weight of a second component selected from the terpolymer group consisting of ethylene/alkylacrylate/ glycidyl methacrylate; ethylene/ alkyl acrylate/glycidyl acrylate; ethylene/alkyl methacrylate/glycidyl acrylate; and ethylene/alkyl methacrylate/glycidyl methacrylate, wherein the alkyl is C1 to C10. Polyester compositions toughened by addition of the modifier composition are disclosed, as are articles molded from these compositions and processes for forming these polyester compositions.

13 Claims, 3 Drawing Sheets

METHOD AND COMPOSITIONS FOR TOUGHENING POLYESTER RESINS

FIELD OF THE INVENTION

The present invention relates generally to a polyester resins, and specifically to compositions, additives and methods of making such resins, for providing resins with desirable qualities.

BACKGROUND OF THE INVENTION

In general, the use of olefinic impact modifiers in polyester compositions to provide molded articles having improved mechanical properties, particularly improved impact resistance has been well known. U.S. Pat. No. 4,172,859 claims polyester blends including ethylene/methyl acrylate/glycidyl acrylate polymers. U.S. Pat. No. 4,753,980 refers to polyester compositions comprising 60–97 weight percent of a polyester matrix (e.g., PBT and/or PET) and 3 to 40 weight percent of an ethylene copolymer of the formula E/X/Y, where E is a radical formed from ethylene; Y is selected from the group consisting of glycidyl methacrylate and glycidyl acrylate and X is a radical formed from

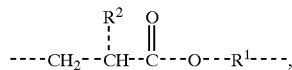

where $R^1$ is alkyl of 2 to 8 C, and $R^2$ is H, $CH_3$ or $C_2H_5$. These compositions contain an ethylene/acrylic polymer where $R^1$ of radical X is methyl. This patent refers to ethylene/butylacrylate/glycidyl methacrylate modifiers as superior to ethylene/methacrylate/glycidyl methacrylate modifiers at lower temperatures.

U.S. Pat. No. 5,175,204 refers to thermoplastic resin compositions which comprise an aromatic polyester and 1 to 50% by weight of a multi-phase structure thermoplastic polyester which is a graft copolymer of 5 to 95% by weight of epoxy group-containing ethylene copolymer and 95–5% by weight of a vinyl polymer or copolymer obtained from at least one vinyl monomer.

These, and other compositions of the prior art are used as materials for industrial parts, electrical and electronic machine parts, automobiles parts and the like. See, also, U.S. Pat. Nos. 4,140,670; 3,368,995; Re. 32,334; 4,499,239; 4,694,042; 5,407,706 and 5,543,464, among others.

There remains a need in the art for polyester based resins which have the improved qualities of toughness, i.e., resistance to impact, as well as melt flow properties enabling the use thereof in molded forms.

SUMMARY OF THE INVENTION

In one aspect, the present invention provides acrylic modifier compositions for improving impact resistance of polyester compositions. Such modifier compositions include (a) between about 10% to about 90% by weight of a first component selected from any of the copolymers ethylene alkyl acrylate co-polymer and ethylene alkyl methacrylate copolymer; and (b) between about 10% to about 90% by weight of a second component selected from the terpolymers ethylene/alkylacrylate/glycidyl methacrylate; ethylene/alkyl acrylate/glycidyl acrylate; ethylene/alkyl methacrylate/glycidyl acrylate; and ethylene/alkyl methacrylate/glycidyl methacrylate.

In another aspect, the invention provides a polyester composition having improved characteristics of impact resistance comprising between about 40 and about 90% by weight of the total composition of a polyester resin containing a polyester and minor amounts of additives; between about 10 to about 50% by weight of the modifier composition described above, from 0 to about 50% by weight of the total polyester composition of a reinforcing agent, and from 0 to about 20% by weight of the total composition of a flame retardant composition.

In still another aspect, the invention provides an article of manufacture molded from the polyester composition above-described.

In yet a further aspect, the invention provides a method for increasing the strength and impact resistance of polyester resins comprising adding to a polyester resin a modifier composition as described above.

In still a further aspect, the method includes the steps of providing (a) a polyester resin, (b) a modifier composition of this invention, (c) an optional reinforcing agent and/or filler, and (d) an optional flame retardant composition; introducing (a), (b), (c) and (d) either individually or as a blend into an extruder. In the extruder, the mixture of (a), (b), (c) and (d) is melted at a temperature in excess of the melting temperature of the polyester, and extruded as an intimate mixture. The extrudate is then cooled to decrease the temperature thereof and solidify the mixture. A final step involves physically reducing the size of the solid polyester composition, i.e., pelletization.

Other aspects and advantages of the present invention are described in the detailed description below and in the claims.

DETAILED DESCRIPTION OF THE INVENTION

The present invention provides a novel impact modifier composition which, when added to certain polyester compositions which can be molded into articles such as automobile parts, etc., increases the impact resistance of such articles, i.e., toughens such compositions. Particularly the modifier compositions of this invention enable the provision of a polyester composition or resin characterized by increased impact resistance with minimal effect upon the solvent resistance of polyester compositions. The resulting molded article from the polyester compositions of this invention also have relatively high elongation at break and a good flex modulus.

As used herein, the term "acrylic modifier composition" or "impact modifier composition" refers to a copolymer/terpolymer two-component composition described in detail below.

As used herein, the term "polyester resin", refers to a polyester, or blend thereof with a minor amount of additives, not including the flame retardant composition or reinforcing agents or fillers, as defined below.

As used herein, the term "polyester composition" or "total composition" refers to a novel composition of the invention which contains a polyester resin, the impact modifier composition of this invention, and optionally includes flame retardants and reinforcing agents or fillers, as described in detail below.

I. Impact Modifier Composition

One aspect of this invention is a novel impact modifier composition for addition to polyester resins or compositions, which are intended to be molded at high temperatures into industrially desired, impact resistant and hydrolysis resistant articles. Such novel impact modifier compositions are formulated to contain two components, a copolymer and a terpolymer. Each component may form between 10 to about 90% of the modifier composition.

The copolymer component is either an ethylene/alkyl acrylate co-polymer or an ethylene/alkyl methacrylate copolymer. The alkyl component of the acrylate or methacrylate polymer in either copolymer has desirably between 1 to 10 carbon atoms. Preferably, the alkyl acrylate or methacrylate polymer of the copolymer is a methyl acrylate or methyl methacrylate. Preferably, the copolymer comprises at least about 30% by weight of the alkyl acrylate or alkyl methacrylate, with the balance being the ethylene polymer. A variety of such copolymers having suitable molecular weight ranges ($M_n$=~15,000 to ~50,000) or suitable viscosities (melt index of 1–300 g/10 minutes at 190° C./2.16 kg) are commercially available. Suitable commercially available copolymers are ethylene/methyl acrylate copolymers sold under the tradenames LOTRYL 29MA03 [Elf Atochem]; and other copolymers sold as; EMAC SP 2205 and 2207 [Chevron Chemical Co.]; and OPTEMA TC-111 [Exxon Chemical], among others.

Figure 1A:
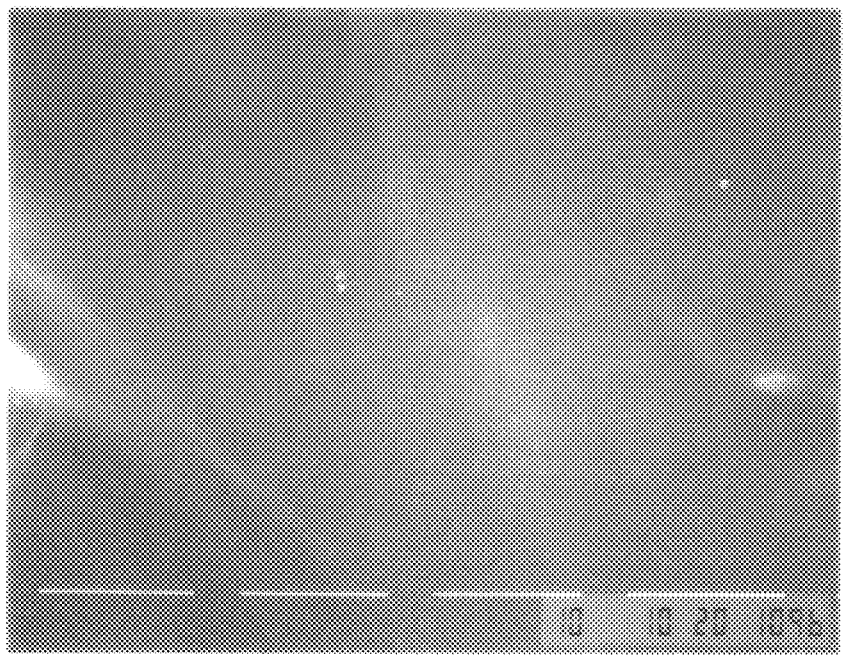
FIG. 1A is a scanning electron micrograph (SEM) of a terpolymer useful in this invention, i.e., an ethylene/methylacrylate/glycidylmethacrylate terpolymer. Magnification is 2000×. This terpolymer is a homogeneous composition. It is not multi-phase, nor particulate.
Figure 1B:
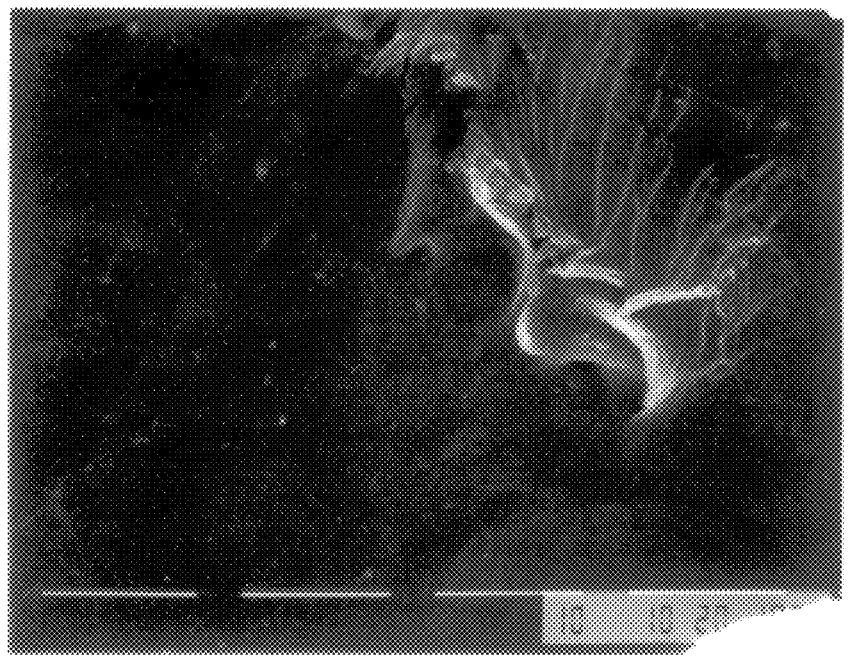
FIG. 1B is a SEM of an ethylene/methylacrylate copolymer useful in this invention. Magnification is 2000×. This copolymer is a homogeneous composition. It is not multi-phase, nor particulate.
Figure 2:
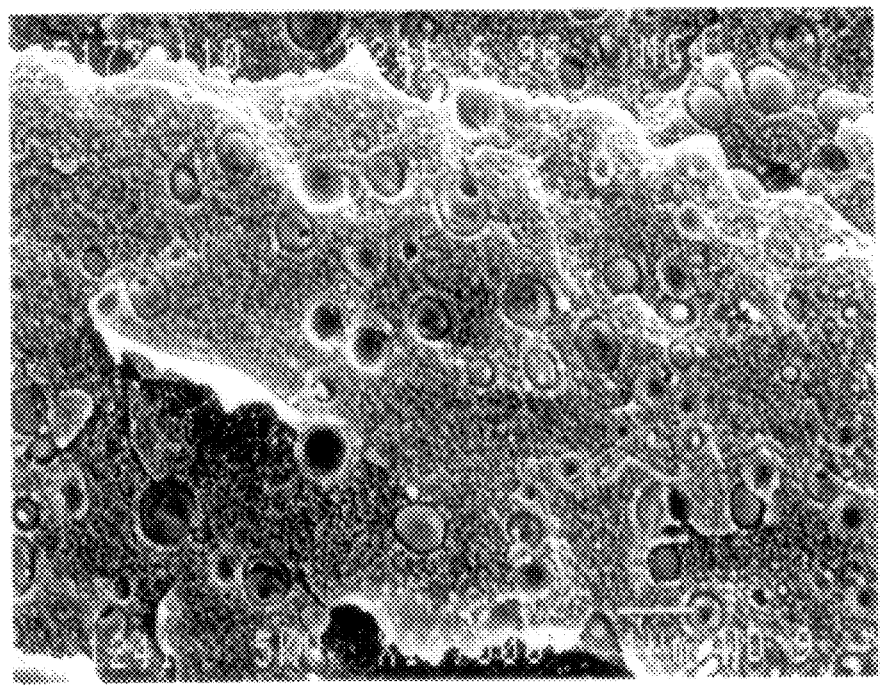
FIG. 2 is a SEM of a polyester composition containing PET with fiberglass and 5% by weight of an ethylene/ethylacrylate (EEA) copolymer. This composition demonstrates poor adhesion of impact modifier (EEA copolymer) used to the PET matrix, and an average particle size greater than 1 micron.
Figure 3:
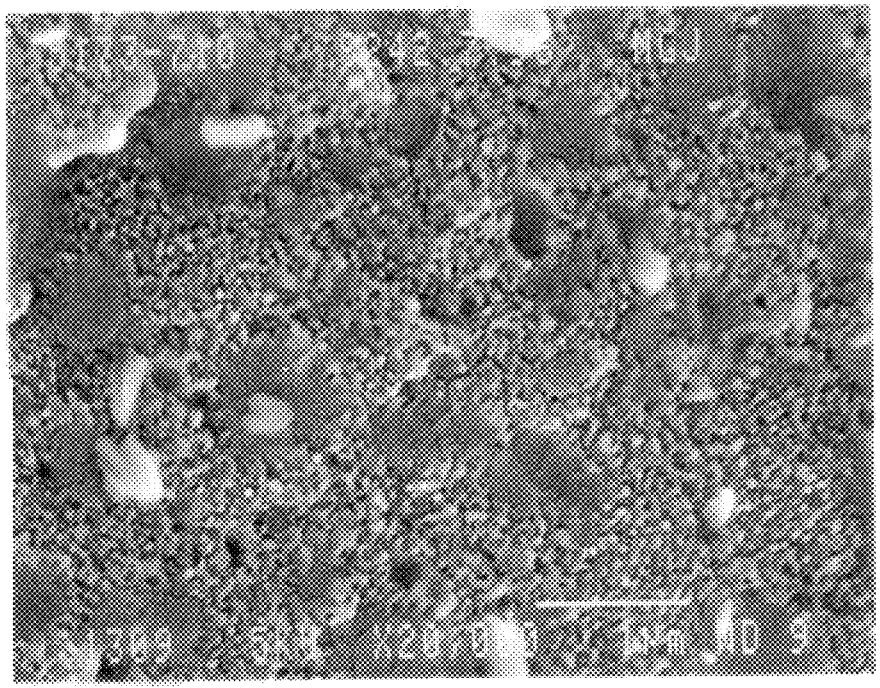
FIG. 3 is a SEM of a polyester composition containing PET with fiberglass and 20% by weight of an ethylene/methylacrylate/glycidylmethacrylate terpolymer. This SEM demonstrates good adhesion to the PET matrix, and an average particle size of less than one micron.
Figure 4:
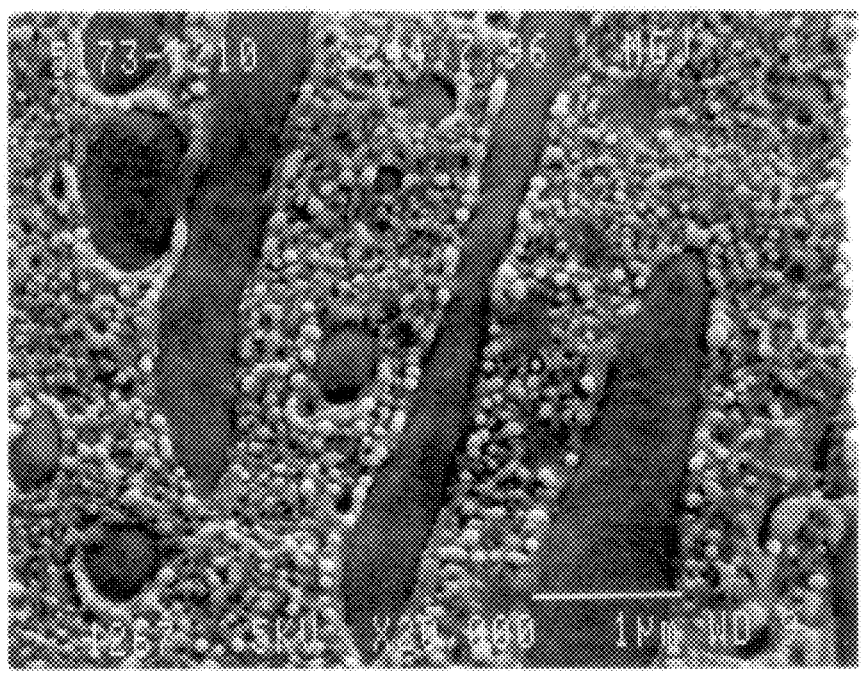
FIG. 4 is a SEM of a polyester composition of PET with fiberglass and 20% by weight of an ethylene/methylacrylate copolymer. This SEM shows elongated particles with a size greater than one micron, and poor adhesion to PET.
Figure 5:
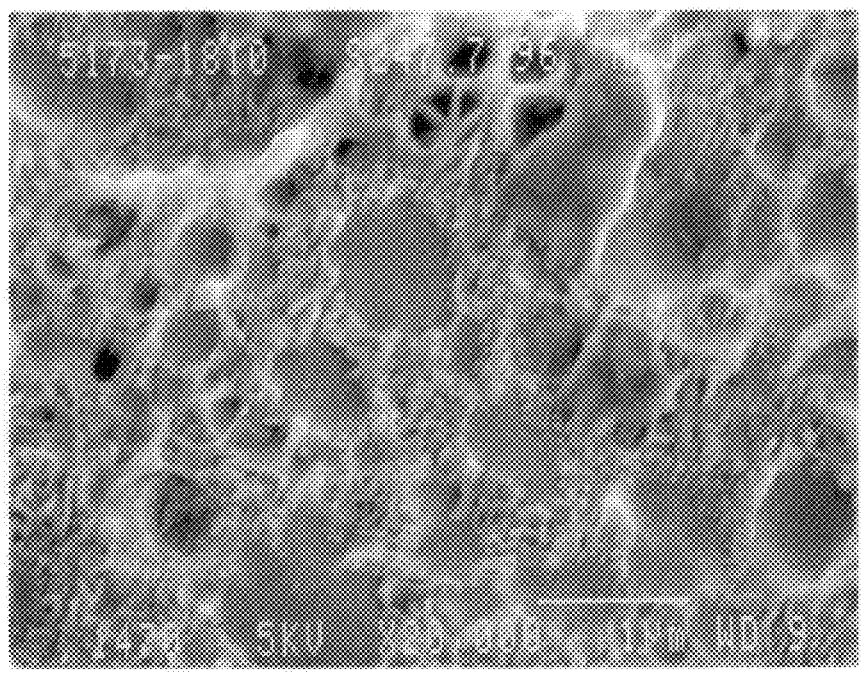
FIG. 5 is a SEM of a polyester composition according to the invention containing PET with fiberglass and an impact modifier of 4% by weight of an ethylene/methylacrylate/glycidylmethacrylate terpolymer and 16% by weight of an ethylene/methylacrylate copolymer. This SEM shows an average particle size of about 1 micron, a spherical particle shape and good adhesion to the polyester.

The terpolymer component of the modifier composition is selected from an ethylene/alkylacrylate/glycidyl methacrylate; an ethylene/alkyl acrylate/glycidyl acrylate; an ethylene/alkyl methacrylate/glycidyl acrylate; and an ethylene/alkyl methacrylate/glycidyl methacrylate. The alkyl component of the acrylate or methacrylate polymer in the terpolymer desirably contains between 1 to 10 carbon atoms. Preferably, the alkyl acrylate or methacrylate polymer of the terpolymer is a methyl acrylate or methyl methacrylate. Preferably the terpolymer comprises between about 1 to about 15% by weight of the glycidyl acrylate or glycidyl methacrylate, and between about 1% to about 40% by weight of the alkyl acrylate or alkyl methacrylate, with the balance being the ethylene units. A variety of such terpolymers having suitable molecular weight ranges ($M_n$= ~10,000 to ~70,000) are commercially available. Suitable, commercially available terpolymers include an ethylene/methyl acrylate/glycidyl methacrylate terpolymer sold under the tradenames LOTADER AX8900, AX8920, AX8660, AX8850, AX8870, [Elf Atochem], The copolymer and terpolymer components of the modifier composition are characterized by a uniform structure (see FIGS. 1A and 1B). Unlike other impact modifiers of the art, these elastomers have no multi-phase structure.

As will be clear to one of skill in the art, from a review of this specification and particularly the examples hereof, a variety of such modifier compositions can be designed to fall within the parameters of this disclosure.

In polyester compositions of this invention, the total amount of an impact modifier composition as defined above forms at least 10% of the total composition. The impact modifier compositions may form 20% of the total composition in other embodiments and in certain applications, may form up to 50% by weight of the total polyester compositions. Advantages of the modifier compositions of this invention include providing an acceptable melt viscosity to the total polyester composition. In practical terms, such modifier compositions are also cost-effective compared to other modifiers of the prior art.

II. Polyester Compositions

Polyester compositions are thus provided which incorporate the impact modifier compositions described above. In general, such polyester compositions are defined as a polyester composition having improved characteristics of impact resistance and containing the following components:

(a) between about 40 and about 90% by weight of the total composition of a polyester resin containing a polyester and minor amounts of additives;

(b) between about 5 to about 25% by weight of the total composition of a component selected from the group consisting of the co-polymers described above;

(c) between about 5 to about 25% by weight of the total composition of a terpolymer as defined above, (d) from 0 to about 50% by weight of the total composition of a reinforcing agent; and (e) from 0 to about 20% by weight of the total composition of a flame retardant composition.

As is clear from the above description of the impact modifier composition, the components (b) and (c) of the polyester composition form the impact modifier composition of the invention. Desirably, then, the total amount of the impact modifier composition in the total composition (i.e., components (b) and (c)) does not exceed 40% by weight of the total weight of the composition described above. Also preferably the total amount of the impact modifier composition in the polyester composition does not exceed 30% by weight of the total weight of the polyester composition. In another embodiment, the total amount of the impact modifier composition in the polyester composition does not exceed 20% by weight of the total weight of the polyester composition.

According to this embodiment of the invention, the polyester composition can employ any number of thermoplastic polyesters known to be amenable to molding to prepare parts. Such polymers should have a suitable stability to the molding conditions as is well known to those of skill in the art. A suitable polyester may be selected from polyethylene terephthalate (PET), polybutylene terephthalate (PBT), poly (ethylene-2,6-naphthalate) (PEN), polyethylene naphthalate bibenzoate (PENBB), poly (1,4-cyclohexanedimethanol terephthalate) (PCT), polypropylene terephthalate (PPT), polybutylene naphthalate (PBN), and liquid crystal polymers (LCPs) such as, for example the VECTRA® brand LCP (Hoechst Celanese Corporation, Somerville, N.J.). Still other suitable polyesters are copolyesters, for example, poly(1,4-cyclohexylene dimethylene terephthalate-co-isophthalate), poly(ethylene terephthalate-co-ethylene naphthalate (PETN), and the like. PET and PBT are the most preferred due to their large availability as well as the fact that molding of such resins are well-known in the industry.

Blends of the above-listed polyesters may also be suitable for polyester compositions of this invention, including preferably blends of two of such polyesters. Blends of three or more polyesters can be used. Such two component blends are formed by a ratio of between about 5 to 50 % by weight of the total blend. For example, a preferred blend useful in this invention is a ratio of between 5 to about 25% PET and about 75 to about 95% PBT, absent other ingredients.

Additionally, such polyester resins or resin blends can contain minor amounts of other polymeric materials, such as polycarbonates, polyphenylene sulfide, polyarylate, polyamide and the like and mixtures thereof.

Preferably these polyesters or co-polyesters are characterized by inherent viscosities of at least 0.4 as measured by ASTM D-2857, and no higher than about 1.4. The modifier composition components (b) and (c) of this invention are very useful with PET alone.

Also as part of the polyester resin of the polyester composition are conventional additives known to the art. Some of them include, for example, antioxidants, stabilizers, lubricants, nucleating agents, colorants, mold release agents, ultraviolet light stabilizers, and the like. Examples of suitable antioxidants include phosphites. Examples of suitable stabilizers include bis-phenol A based epoxy. Examples of suitable lubricants include olefinic waxes. Examples of suitable nucleating agents include sodium salts. Additives which improve physical properties can also be employed including those which improve tensile strength or the other physical characteristics desirable in such resins. Some of these characteristics are listed in Table 1 below. These additives are present in relatively minor amounts and do not unduly affect the desired characteristics of the finished products. Generally, the additives are present in an amount of between about 1 to about 5% of the total composition.

A separate and optional component of the polyester composition is a flame retardant composition or package used at a conventional level. Generally, such flame retardant compositions include a bromine containing compound (such as brominated polycarbonate, decabromodiphenyloxide, brominated acrylic, brominated polystyrene, etc.). Such compounds are available commercially, such as from Ethyl Chemical Corp., Great Lakes Chemical Corp., Dead Sea Bromine Co., etc. Also part of the flame retardant package is a synergist, typically e.g., antimony oxide, zinc oxide, and sodium antimonate, among others known to the art. Still a third component of the flame retardant composition is a drip suppressant, such as asbestos, teflon and the like. Suitable flame retardant compositions are known to the art and the selection of the components thereof does not limit the present invention. If a flame retardant composition is present in the polyester composition of this invention, it is present in a percentage by weight of the total composition of between 0 to about 20%.

In addition to the impact modifier composition components which are discussed in detail above, the total polyester composition may include reinforcing agents or fillers. Generally, such reinforcing agents or fillers may be present in the total composition between about 0 to about 50% by weight of the total composition.

Thermally stable reinforcing agents or reinforcing fibers used in the invention may be any such agents or fibers which are thermally stable at the conditions normally used in the production of products from polyester molding compositions. Suitable reinforcing agents include, for example, glass fiber, asbestos fiber, carbon fiber, ceramic fiber, fibrous potassium titanate, iron whiskers, and the like. Glass is the most preferred. While fiber is the most preferred form for the reinforcing agent, other suitable forms may also be employed in the practice of the invention. Where reinforcing fibers are used, such fibers should normally have diameters between about 5 and about 30 microns, typically from 10–21 μm, and preferably from 11–16 μm. Aspect ratios (ratio of length of fiber to diameter of fiber) are desirably at least about 5. The reinforcing fiber typically has a length of generally from 1–10 mm, preferably from 2–6 mm and more preferably from 3–5 mm. Glass fibers, where used, preferably have diameters between about 10 and about 15 microns and aspect ratios of at least about 20.

The reinforcing agent/fiber is employed in the polyester composition generally in the range of about 3 to about 50 weight percent based on total weight of the total polyester composition, typically 10–35 weight percent, and preferably 10–30 weight percent. As is commonly recognized, the use of such reinforcing agents/fibers improves substantially such physical properties as tensile strength, flexural strength, flexural modulus and heat distortion temperature of the polyester composition.

Glass or other fibers/agents for use in the invention may be manufactured and incorporated into the composition in any suitable manner, such as by separate extrusion blending with the polyester resin, extrusion blending with other ingredients of the compositions of the invention or incorporating into the resin or polyester composition during injection molding of products from the polyester composition.

Suitable fillers include, but are not limited to, mica, talcum, clay, titanium dioxide and the like. There may be variants within the same filler type such as, for example, the muscovite type mica (supplied by KMG, Inc.), the phlogopite type mica (Suzorite, Inc.) and the like. The size of the filler particles is in the general range of 20–500 μm, typically in the range 30–100 μm and preferably 40–60 μm. The filler is employed in the polyester composition, generally in the range 5–35 weight percent, typically 7–25 weight percent, and preferably 10–20 weight percent.

In one presently preferred embodiment, a polyester composition of the present invention contains about 61.5% by weight of the total composition of PET with about 3.5% additives. About 16% by weight of the total composition is the copolymer ethylene/methyl acrylate. About 4% by weight of the total composition is the terpolymer ethylene/methyl acrylate/glycidyl methacrylate. Finally, about 15% by weight of the total composition is fiberglass. This composition is characterized by a notched Izod impact strength of about 3.5 ft-lb/in.

As will be obvious to those of skill in the art, other polyester compositions falling within this description can be readily prepared by resort to the teachings herein. Useful compositions may have a variety of characteristics, depending on the use to which the molding polyester composition is put. The primary characteristic of the composition is a good notched or unnotched Izod impact strength (ASTM D-256). Generally, the higher the Izod measurement, the better. However, other characteristics which are important in the use of these molding compositions are tensile strength, break elongation and tensile modulus, as measured by ASTM D-638; viscosity measured in shear rate of 1000 sec$^{-1}$ at 280° C., flex stress and flex modulus (ASTM D-790) and heat deflection temperature (ASTM D-648). Such characteristics are conventional in the art.

Generally, the polyester compositions of this invention are useful in the preparation of molded articles of manufacture, including without limitation, automobile panels, automobile parts, industrial plumbing and other construction parts.

III. Methods of Preparing the Modifier Compositions, the Polyester Compositions and the Molded Articles.

The polyester compositions of this invention are prepared by resorting to conventional methods. The impact modifier composition may be prepared by first dry mixing the components. For example, with regard to the impact modifier composition itself, the co-polymers and terpolymers may simply be blended or dry mixed at any convenient speeds and at room temperature.

Thus, the impact modifier composition components may be combined and sold as a physical or mechanical blend for addition to the polyester resin during manufacture of the polyester composition.

Alternatively, the individual components of the modifier composition may be dry mixed directly with the components of the polyester resin. The other ingredients of the polyester composition may also be added.

In preparing molded compositions of the invention, the reinforcing fibers may be intimately blended into the polyester resin by any suitable means such as by dry blending or melt blending, blending in extruders, heated rolls or other types of mixers, etc. Conventional master batching techniques may also be used. The same considerations apply to addition of the other essential or optional ingredients of the composition of the invention, including specifically an inert filler of low aspect ratio, the reinforcing agents, the polyester compositions, etc. Suitable blending and molding techniques are well known in the art and need not be described in detail herein.

The extrusion may be carried out in a suitable extruder such as for example a twin screw extruder with down-stream feeding capability. Many such extruders are commercially available such as, for example, the 40 mm Werner Pleiderer twin screw extruder. The extruder may be fed with the resin and additives stated above at the main feeder while the glass is fed downstream. The machine temperature is kept at a suitable level above the melting point of the selected polyester(s). For PET, for example, the temperature may range 260–300° C. The material is compounded and then extruded into a suitable shape such as, for example, pellets. The pellets may then be injection molded into suitable parts.

In a preferred embodiment of the invention, the polyester composition of the invention is compounded by dry blending the polyester resin, the reinforcing agent and/or filler and the impact modifier composition, followed by melt mixing in an extruder at a temperature which exceeds the melting point of the polyester resin, i.e., with barrel temperatures between about 260 and about 300° C. Likewise, in molding products of the invention from molding polyester compositions of the invention; injection molding is preferred. When injection molding is used, barrel temperatures between about 260 and 290° C. are preferred. In a preferred embodiment, the molding polyester composition of the invention is formed by extrusion and pelletized. Products of the invention are then produced by injection molding the pelletized extrudate.

In still another alternative, the individual components of the modifier composition may be added to the extruder separately from the polyester resin and other components of the polyester composition. The components may be blended into the molten mixture prior to cooling. There are a number of alternative manufacturing steps which can be employed with the compositions of this invention. Such manufacturing steps are intended to be encompassed in this invention, as they are routine to one of skill in the art in the preparation of such compositions.

Finally, the polyester compositions of this invention containing the impact modifier compositions, when obtained by the end user, may be dried by any convenient method, remelted and molded into a number of industrially useful products, as described above.

The following examples illustrate the preferred compositions and methods of the invention. These examples are illustrative only and do not limit the scope of the invention. All percentages are by weight, unless otherwise indicated.

EXAMPLE 1

COMPARISON OF IMPACT MODIFIER COMPOSITIONS

In the following studies, a variety of impact modifier compositions or components thereof were studied in a polyester composition which consisted of polyethylene terephthalate and conventional additives, and 15% fiberglass as a reinforcing agent. The indicated modifier composition was incorporated at percentages indicated in column 1 of each of Table 1 and Table 2.

For the purposes of the data reported in Tables 1 and 2, standard ASTM tests were conducted on the polyester composition. For example, viscosity was reported at a shear rate of 1000 sec$^{-1}$; tensile stress and flex stress are reported in kpsi, break elongation is reported in percentage; tensile modulus and flex modulus are reported in mpsi, notched Izod and unnotched Izod impact results are reported as ft-lb/in., heat deflection temperature (i.e., deflection temperature under load) is reported at 264 psi and reported in °C.[1] and at 66 psi reported in °C.[2]. These characteristics are tested using the ASTM test designations identified above.

The following components are used in the Tables 1–2 below. COMPONENT A represents a commercial composition of ethylene ethylacrylate (Union Carbide). COMPONENT B represents a terpolymer of ethylene/methyl methacrylate/glycidyl methacrylate with a high (i.e., greater than 5% by weight) epoxy (glycidyl) level (Elf Atochem). COMPONENT C is a terpolymer of ethylene/methyl methacrylate/glycidyl methacrylate with a low (i.e., less than 5% by weight) epoxy (glycidyl) level (Elf Atochem). COMPONENT D is a 70%/30% ethylene/methyl acrylate copolymer with a melt index lower than 5. Suitable co-polymers are marketed by Elf Atochem.

TABLE 1

| Modifier | Viscosity | Tensile Strength | Break Elong'n | Tensile Modulus | Flex Stress | Flex Modulus |
|---|---|---|---|---|---|---|
| 5% A | 2011 | 14.1 | 2.5 | 0.86 | 23.4 | 0.80 |
| 5% B | 4972 | 14.4 | 2.9 | 0.86 | 23.7 | 0.75 |
| 5% C | 2471 | 14.7 | 2.8 | 0.88 | 23.7 | 0.30 |
| 5% D | 1911 | 14.9 | 2.8 | 0.89 | 23.8 | 0.78 |

| Modifier | Notched Izod | Unnotched Izod | HDT[1] | HDT[2] |
|---|---|---|---|---|
| 5% A | 1.10 | 5.0 | 165 | 233 |
| 5% B | 1.92 | 9.3 | 133 | 235 |
| 5% C | 1.42 | 6.8 | 156 | 232 |
| 5% D | 1.25 | 6.5 | 186 | 233 |

TABLE 2

| Modifier | Viscosity | Tensile Strength | Break Elong'n | Tensile Modulus | Flex Stress | Flex Modulus |
|---|---|---|---|---|---|---|
| 10% B | 5444 | 13.1 | 3.0 | 0.81 | 21.5 | 0.70 |
| 15% B | 4252 | 12.3 | 3.3 | 0.82 | 20.2 | 0.68 |
| 20% B | 6002 | 11.0 | 3.6 | 0.74 | 16.8 | 0.60 |
| 10% C | 2410 | 13.4 | 2.9 | 0.89 | 21.3 | 0.72 |
| 15% C | 3110 | 11.9 | 3.1 | 0.77 | 19.5 | 0.65 |
| 20% C | 3379 | 10.0 | 3.6 | 0.69 | 16.3 | 0.58 |
| 20% D | 1855 | 5.7 | 2.6 | 0.48 | 7.8 | 0.34 |
| 16% B/4% D | 7769 | 10.5 | 3.9 | 0.69 | 16.9 | 0.60 |
| 14% B/6% D | 7365 | 10.8 | 3.7 | 0.72 | 17.0 | 0.60 |
| 12% B/8% D | 7016 | 10.7 | 4.1 | 0.70 | 17.4 | 0.59 |
| 10% B/10% D | 7090 | 11.2 | 4.0 | 0.75 | 17.4 | 0.61 |
| 6% B/14% D | 5739 | 10.9 | 3.9 | 0.71 | 17.0 | 0.58 |
| 4% B/16% D | 3370 | 10.8 | 3.8 | 0.70 | 17.1 | 0.60 |

| Modifier | Notched Izod | Unnotched Izod | HDT[1] | HDT[2] |
|---|---|---|---|---|
| 10% B | 2.73 | 16.2 | 170 | 231 |
| 15% B | 3.36 | 17.3 | 137 | 230 |
| 20% B | 4.84 | 20.3 | 109 | 226 |
| 10% C | 1.92 | 8.2 | 151 | 229 |
| 15% C | 2.44 | 13.3 | 146 | 230 |
| 20% C | 2.70 | 14.4 | 106 | 219 |
| 20% D | 1.30 | 8.0 | 73 | 91 |
| 16% B/4% D | 4.09 | 19.5 | 110 | 226 |
| 14% B/6% D | 4.00 | 19.8 | 107 | 228 |
| 12% B/8% D | 3.74 | 18.1 | 114 | 224 |
| 10% B/10% D | 3.83 | 18.8 | 118 | 222 |
| 6% B/14% D | 3.57 | 16.7 | 117 | 225 |
| 4% B/16% D | 3.57 | 18.4 | 105 | 221 |

As illustrated in the data reported in Table 1 above, individual copolymers (A and D) and terpolymers (B and C) useful in the present invention, when used alone at the 5% level as impact modifiers, produced Izod impacts similar to commercial PETs. For example, for components A through D when used at a level of 5% as impact modifiers in the PET composition, the notched Izod impact measurements ranged between 1.10 to 1.92. The unnotched Izod impact measurements range between 5.0 to 9.3 for these same compositions.

Comparing results of Tables 1 and 2, Component B, when raised from 5% (Table 1) to 20% by weight (Table 2) as the impact modifier, produced an increase in notched Izod measurement from 1.92 to 4.84, and in unnotched Izod from 9.3 to 20.3. Component C, when raised from 5% (Table 1) to 20% by weight (Table 2) as the impact modifier, produced an increase in notched Izod measurement from 1.42 to 2.70, and in unnotched Izod from 6.8 to 14.4. Component D alone as impact modifier when raised from 5% (Table 1) to 20% by weight (Table 2) in the composition produced no or little appreciable change in notched Izod (1.25 to 1.3) or unnotched Izod measurement (6.5 to 8.0).

Thus, it appears that Components B and C are good impact modifiers when used alone, but Component D is not an effective impact modifier when used alone in polyester.

Surprisingly, then, and in accordance with the present invention, an impact modifier composition containing Component B and Component D produced the best results in the PET composition of the experiment. The good results appear independent of the ratio of the two components to each other (see Table 2). In fact the best overall results, taking into account the other test results as well as Izod measurements, are provided by the impact modifier composition containing 4% terpolymer B and 16% copolymer D. Another good impact modifier composition contains 14% by weight terpolymer B and 6% by weight co-polymer D.

EXAMPLE 2
OTHER POLYESTER RESINS

These examples demonstrate the use of another resin in the polyester compositions of the present invention.

A. The polyester composition tested contained a polyester resin of about 67.5% PBT and additives, and 7.5% by weight polycarbonate. The other components of the polyester composition included 12.5% by weight of the reinforcing agent glass fiber, 2.5 % by weight of the filler, glass flake and 10% by weight of the indicated modifier or modifier composition.

The impact modifiers tested included COMPONENT A of Example 1, the Rohm and Haas core shell modifier marketed under the trademark EXL2330, and a modifier composition according to the present invention comprised of 3.3% COMPONENT B and 6.7% COMPONENT D of Example 1. Table 3 shows Izod measurements which were reported in the ISO Izod tests in kilojoules per square meters.

TABLE 3

| Modifier | Notched Izod | Unnotched Izod |
|---|---|---|
| 10% A | 7.4 | 31 |
| 10% EXL2330 | 7.9 | 33 |
| 3.3% B/6.7% D | 11.2 | 45 |

The results demonstrate that the impact modifier composition of the present invention is effective in a PBT/polycarbonate resin-containing polyester composition.

B. The polyester composition tested contained a polyester resin of about 80% by weight PBT and conventional additives, no filler, no reinforcing agent, and 20% by weight of the indicated modifier or modifier composition.

The impact modifier compositions of the invention tested included 12% COMPONENT B/8% COMPONENT D of Example 1, and 4% COMPONENT B and 16% COMPONENT D of Example 1. The ISO Izod measurements are reported in Table 4 in kilojoules/square as described immediately above, but in this case are reported at three different temperatures, room temperature (RT), −20° C. and −40° C. Room temperature impact of PBT alone would be at most 5.5 (ISO method).

TABLE 4

| | Notched Izod Impact at | | |
|---|---|---|---|
| Modifier | RT | −20° C. | −40° C. |
| 12% B/8% D | No break | 15 | 10 |
| 4% B/16% D | 18 | 16 | 10 |

This data also shows that modification of impact occurs similarly in a polyester resin matrix other than PET.

C. Various other compositions containing glass reinforcing agent components ranges from 0 to 30% by weight in a PET composition using the 4%B/16%D modifier composition have preliminarily provided data demonstrating good impact in the final polyester composition as measured in the ISO Izod tests.

All references and patents cited above are incorporated herein by reference. Numerous modifications and variations of the present invention are included in the above-identified specification and are expected to be obvious to one of skill in the art. Such modifications and alterations to the compositions and processes of the present invention are believed to be encompassed in the scope of the claims appended hereto.

What is claimed is:

1. A polyester composition having improved characteristics of impact resistance comprising:

(a) at least about 40% by weight of the total composition of polyethylene terephthalate;

(b) between about 5 to about 25% by weight of the total composition of an ethylene/alkyl (meth)acrylate copolymer, wherein said alkyl is C1 to C10 and said copolymer consists of ethylene and alkyl (meth) acrylate comonomers;

(c) between about 5 to about 25% by weight of the total composition of a component selected from the terpolymer group consisting of ethylene/alkylacrylate/glycidyl acrylate; ethylene/alkyl acrylate/glycidyl methacrylate; ethylene/alkyl methacrylate/glycidyl acrylate; and ethylene/alkyl methacrylate/glycidyl methacrylate, wherein said alkyl is C1 to C10;

(d) from about 3 to about 50% by weight of the total composition of a reinforcing agent; and (e) from 0 to about 20% by weight of the total composition of a flame retardant composition, wherein the ratio by weight of component (b) to component (c) in the composition ranges from about 1:4 to 4:1 and the total amount of components (b) and (c) combined does not exceed 40% by weight of the total weight of the composition; component (b) has an alkyl (meth)acrylate content of from about 20 to about 30 weight percent; and component (c) has a glycidyl (meth)acrylate content of from about 1 to about 10 weight percent and an alkyl (meth)acrylate content of from about 20 to about 30 weight percent.

2. The composition according to claim 1 wherein the total amount of components (b) and (c) combined does not exceed 20% by weight of the total weight of the composition and reinforcing agent is present in an amount of from 10 to 30 weight percent based on the total weight of the composition.

3. The composition according to claim 2 comprising:

(a) about 65% by weight of the total composition of a polyethylene terephthalate resin containing about 3.5% by weight additives;

(b) about 16% by weight of the total composition of ethylene/methyl acrylate;

(c) about 4% by weight of the total composition of terpolymer ethylene/methyl acrylate/glycidyl methacrylate; and (d) about 15% by weight of the total composition of fiberglass wherein component (b) has a methyl acrylate content of about 30 weight percent and an ethylene content of about 70 weight percent and component (c) has a methyl acrylate content of about 25 weight percent and a glycidyl methacrylate content of about 8 weight percent.

4. The composition according to claim 1 wherein said component (b) is an ethylene/methyl acrylate copolymer.

5. The composition according to claim 1 wherein said reinforcing agent is selected from the group consisting of glass beads; glass flakes; fiberglass, asbestos fibers, mica, talc, carbon fiber, and steel fiber.

6. The composition according to claim 1 which further comprises one or more additives selected from the group consisting of lubricants, stabilizers, antioxidants, nucleating agents, colorants, mold release agents, and ultraviolet light stabilizers.

7. The composition according to claim 1 wherein said reinforcing agent is present in an amount of 10 to 35 weight percent, based on the total weight of the composition.

8. A composition as described in claim 1 wherein component (c) is an ethylene/alkyl acrylate/glycidyl methacrylate terpolymer.

9. A composition as described in claim 7 wherein component (c) is an ethylene/methyl acrylate/glycidyl methacrylate terpolymer.

10. A composition as described in claim 7 wherein component (b) is an ethylene/alkyl acrylate copolymer.

11. An article of manufacture molded from the polyester composition of claim 1.

12. A reinforced polyethylene terephthalate composition containing:

(a) at least 10% by weight, based on the total weight of the composition, of an acrylic modifier consisting essentially of:

(i) a first component that is an ethylene/alkyl acrylate copolymer consisting of ethylene and alkyl acrylate comonomers, wherein said alkyl is C1 to C10 and wherein said ethylene/alkyl acrylate copolymer has an alkyl acrylate content of from about 20 to about 30 weight percent; and (ii) a second component selected from the terpolymer group consisting of ethylene/alkylacrylate/glycidyl methacrylate, ethylene/alkyl acrylate/glycidyl acrylate, ethylene/alkyl methacrylate/glycidyl acrylate, and ethylene/alkyl methacrylate/glycidyl methacrylate, wherein said alkyl is C1 to C10 and wherein said second component has an alkyl (meth) acrylate content of from about 20 to about 30 weight percent and a glycidyl (meth)acrylate content of from about 1 to 10 weight percent; and (b) from 10 to 35% by weight, based on the total weight of the composition, of a reinforcing agent, wherein the composition contains at least about 40% by weight of polyethylene terephthate, the ratio by weight of component (i) to component (ii) ranges from 1:4 to 4:1, and the acrylic modifier does not exceed 30% by weight of the composition.

13. An article of manufacture molded from the reinforced polyethylene terephthalate composition of claim 12.

* * * * *